Figure 1:
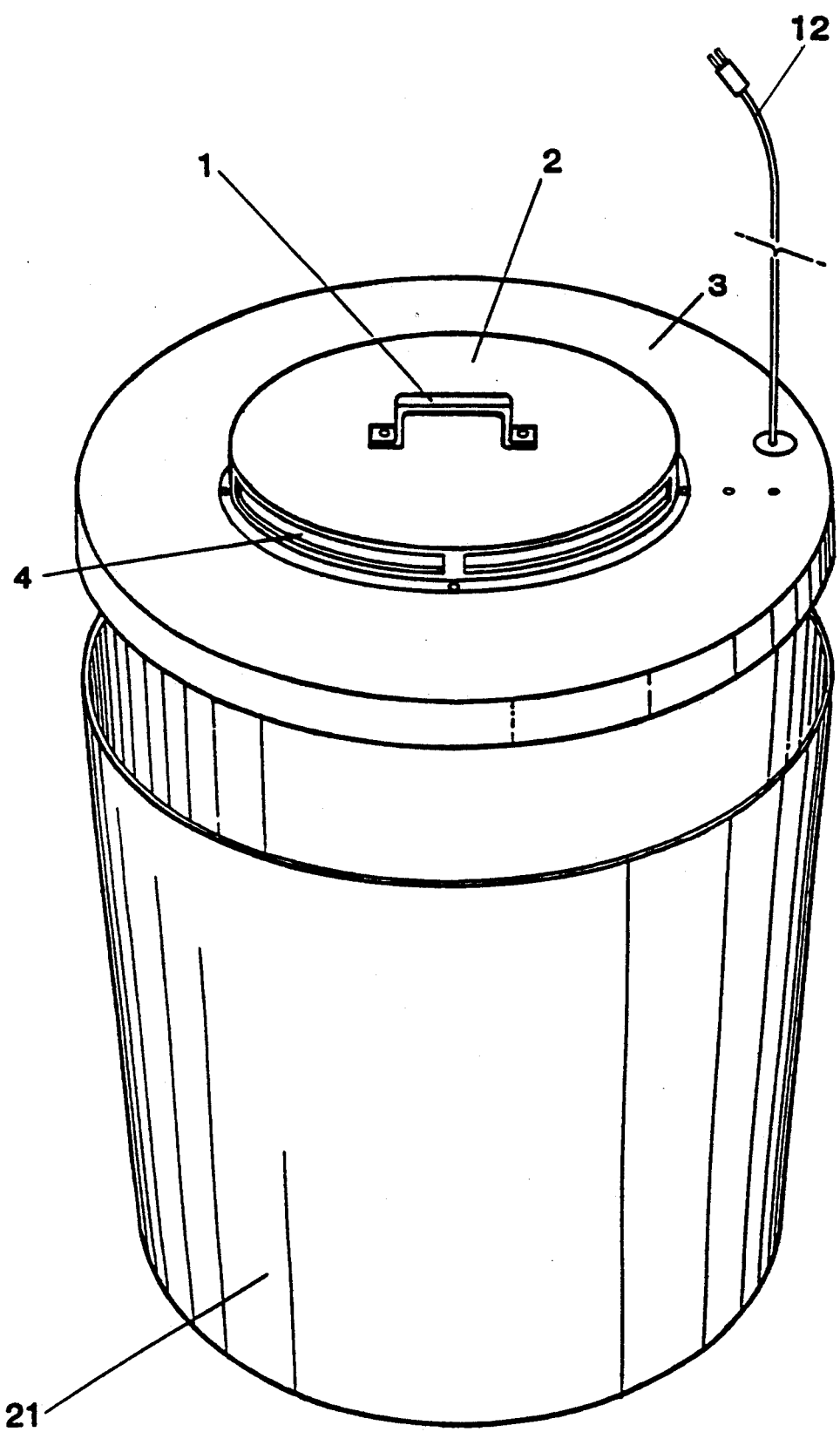

United States Patent
Filonczuk

[11] Patent Number: 5,280,684
[45] Date of Patent: Jan. 25, 1994

[54] INSECT KILLING RECEPTACLE COVER

[76] Inventor: Michael A. Filonczuk, 5732 Oakdale Ave., Los Angeles, Calif. 91367

[21] Appl. No.: 740,332

[22] Filed: Aug. 5, 1991

[51] Int. Cl.⁵ .................... A01M 1/10; A01M 1/22
[52] U.S. Cl. ................................. 43/120; 43/112
[58] Field of Search ........................ 43/98, 112, 120

[56] References Cited

U.S. PATENT DOCUMENTS

| | | | |
|---|---|---|---|
| 1,043,774 | 11/1912 | Kirkman | 43/120 |
| 1,324,727 | 12/1919 | Carlson | 43/120 |
| 1,815,122 | 7/1931 | Smith | 43/120 |
| 2,113,908 | 4/1938 | Thompson | 43/120 |
| 2,307,163 | 1/1943 | Shea | 43/112 |
| 2,373,428 | 4/1945 | Stone | 43/112 |
| 2,576,118 | 11/1951 | Holte | 43/112 |
| 3,729,857 | 5/1973 | Giordano | 43/112 |
| 3,768,196 | 10/1973 | Iannini | 43/112 |
| 4,144,668 | 3/1979 | Darncharnjitt | 43/112 |
| 4,709,502 | 12/1987 | Bierman | 43/112 |
| 4,914,854 | 4/1990 | Zhou et al. | 43/112 |

*Primary Examiner*—Kurt C. Rowan

[57] ABSTRACT

An insect killing receptacle cover whereby odors emanating from a chemical insect-attractant means placed within the receptacle will draw insects through access holes in the cover and in contact with an electrical means where they will be killed attempting to reach the chemical insect-attractant means, and then fall into the receptacle.

3 Claims, 2 Drawing Sheets

INSECT KILLING RECEPTACLE COVER

1. Background Field of Invention

This invention relates to receptacle covers, specifically to such covers fitted with an insect killing aperture.

2. Description of Prior Art

Trash receptacles in conjunction with a tight fitting lid were designed to keep insects from feeding and breeding on garbage in the receptacle and proliferating.

These prior art receptacles and their covers are ineffective in eliminating unwanted insects, and specifically flies because:

a. People rarely take the time to properly fit the cover on their trash receptacles. This allows insects and specifically flies easy access in and out of the receptacle where they can feed and multiply rapidly.

b. There is no integral mechanism for attempting to control insect population by actually killing insects. Refuse containers and covers are designed only to provide a barrier between the insects and their feeding and breeding areas, garbage being one of these areas. Once the barrier is gone, as when the cover is missing, or loose fitting, the insect population increases unchecked.

In another prior art, electronic insect killers are designed in part specifically to attempt to control fly population. These prior art electronic insect "zappers" suffer from the following disadvantages with respect to many day active insects and specifically to flies because;

c. They are all constructed with some type of ultra-violet light source that lures night flying insects into an alternately charged grid, or bars, where high voltage passes through their bodies and electrocutes them. Flies and other insects are not as active at night as they are in the daytime and are not attracted to the same wavelengths of light as other night flying insects. Thus, due to the flies inactivity at night, when most prior art "zappers" are turned on, and the fly's lack of interest in the light as a lure, prior art "zappers" are ineffective at killing flies and other day active insects.

d. People tend not to turn on any device that contains a light during the daytime. So most "zappers" are off during the daytime when flies and other insects are most active.

e. Some prior art insect "zapper" designers have realized how ineffective light is at luring flies toward the alternately charged bars and electrocution. They have tried to remedy this by selling fly sex attractant to be used in conjunction with their "zapper". The sex attractant is smelly, messy, and difficult to apply. The attractant is placed adjacent to the charged bars and not behind them. Thus the flies can reach the lure without passing through the bars and therefore avoid electrocution. Only the unlucky flies who wander too close to the alternately charged bars are killed. The sex attractant must be continuously monitored and replenished regularly as needed. Therefore the prior art devices are ineffective and inefficient at luring files directly to the killing means.

f. Prior art "zappers" utilizing the sex attractant as a lure must presently be turned on during the day to be effective. Unfortunately the ultraviolet light, useless as a lure in the daytime, cannot be controlled separately and is concurrently switched on wasting valuable energy. Therefore the prior art combination of ultra violet light and killing means in a single circuit presently requires the wasteful application of ultra violet light in an environment where only the killing means is required.

g. The alternately charged bars that electrocute the insects, in the prior art, are always placed vertically surrounding the light source. Upon lengthy observations, the applicant has observed that flies tend to avoid landing on or flying through bars mounted vertically. When the bars are turned horizontally, the flies are very susceptible to electrocution either by landing on the horizontal bars or "cutting power" to their wings and dropping between the horizontal bars thus electrocuting themselves. Through lengthy observation and experimentation utilizing a killing means in the horizontal and vertical orientation, it has been observed that many more flies are killed by the horizontal grid. Therefore the vertical design of the charged bars reduces the fly killing effectiveness of the prior art "zapper". To increase effectiveness the prior art unit would have to be laid horizontal. This is something they cannot achieve without severe modification of the design of the devices of the prior art. Being round and designed to hang from a hook the "zapper" becomes very unstable in the horizontal orientation.

h. To be most effective, "zappers" are normally placed in the zone that needs to be cleared of insects,. Patios and backyards are common sites. When the fly sex attractant is placed in the device, which may or may not be presently turned on, more flies are lured to the area than would normally congregate there. So instead of decreasing the amount of flies in the area, the number of unwanted flies active in the area increases, creating instead of abating a nuisance.

i. If insects are attracted and killed by the prior art "zapper" their bodies explode from the high voltage and their remains fall to the ground or into the base of the "zapper". Eventually a clean-up of the "zapper" and surrounding area is necessary. The prior art devices therefore unfortunately create unsanitary insect debris in the surroundings.

j. There are many other insects that are daylight active and are not attracted either to ultraviolet light or fly sex attractant. Yellow jackets, hornets, ants, spiders and wasps, to name a few, are unaffected by light emitting prior art "zappers" because their attractant means is too narrowly specific and are not drawn to the attractant in the course of their normal foraging behavior.

As outlined in the earlier discussion, there are several reasons why prior art trash receptacles and their covers are ineffective at reducing and controlling insect and specifically the fly population. People's careless placement of the cover on the receptacle and the very design of the trash receptacle and its cover as a preventative barrier and not a means to kill insects results in an ineffective insect control design.

Similarly the above mentioned prior art electronic insect "zappers" are also ineffective in controlling day active insects and specefically fly populations because they are designed to kill night flying insects attracted to ultra-violet light and flies are most active in daytime. They are also ineffective because prior art "zappers" have a light and therefore people simply won't turn them on in the day when the flies are most active. They require added fly sex attractant which needs to constantly be replaced, costs extra money, doesn't lure the flies into the killing zone, and draws more flies into the area without killing them. Furthermore the alternately charged bars that actually kill the insects are vertical and, as observed, commonly avoided by the insects. Also prior art "zappers" turned on in daytime with added sex attractant waste energy by utilizing an unnecessary ultra-violet light in a single circuit with the killing means. And finally, prior art "zappers" are ineffective against other day active insects beside the fly.

Therefore, prior art receptacles and their covers, and prior art electronic insect "zappers" as presently separately utilized are virtually ineffective at controlling or reducing day active insects and specifically the fly population, as demonstrated above.

OBJECTS AND ADVANTAGES

However, the synergism created by combining these two above mentioned ineffective products leads to a new and very unexpected result and thereby creates an effective product.

By placing a means of electrocuting insects horizontally across an opening or hole in a receptacle cover, insects naturally drawn to the odors emanating from a chemical insect-attractant means placed in the receptacle attempt to, and easily enter the receptacle through said hole, are electrocuted and fall directly into the receptacle.

This combination creates an entirely new device with many advantages over individual prior art. Some of the advantages are listed below:

a. As stated earlier, people don't take time to properly use standard trash receptacles and their covers. They often never use covers at all. Therefore, someone who consciously buys a trash receptacle specifically designed with an insect killing cover would definitely use it to solve a specific problem, namely, too many insects, and specifically flies. People hate flies and will revel at the thought of reducing the fly population in their environment.

b. Since a standard trash receptacle with a cover is only a barrier to keep existing insects from entering the receptacle and multiplying, a cover that allows synergy of the natural lure of garbage to provide a means to attract and then kill insects is a major improvement, and a new value in the use of a previously unrecognized feature of garbage. Also, many times refuse in the can is already contaminated with insect larvae and once the cover is removed, hundreds of newborn insects are released. In contrast, the present invention teaches an insect killing receptacle cover in which newborn insects attempting to leave the trash receptacle would be killed and fall immediately back into the receptacle before escaping into the outside environment.

c. As described earlier, daytime active insects simply are not attracted at night to a prior art "zapper" like other night flying insects are. In contrast however, some daytime active insects and specifically flies are extremely attracted to trash receptacles with smelly garbage inside. The opening in the insect killing receptacle cover, according to the present invention, allows odors, known to the art as a chemical insect-attractant means, from the garbage in the receptacle out to lure the insects to the receptacle and when they attempt to reach the garbage they must pass through the alternately charged bars and are instantly electrocuted.

d. Prior art "zappers" must be turned on to lure and kill insects. In contrast the insect killing receptacle cover does not require a useless energy wasting light to attract the insects. Instead it simply uses free garbage as it's attractant means. The insect killing cover can be left on at all times because energy is only expended when an insect is electrocuted. This is in contrast to prior art devices whose single circuit requires the wasteful utilization of ultra violet light.

e. One of the most important advantages the insect killing receptacle cover has over an ordinary prior art "zapper" is that even with expensive sex attractant applied to the "zapper", the insects can reach the sex attractant without touching the vertical oppositely charged bars because the sex attractant is located adjacent to the killing means and not in a direct path behind the killing means. The insect killing receptacle cover, however puts the killing means between the chemical insect-attractant means, and the insect. In contrast to the prior art, in order to reach the chemical insect-attractant means, the insect must pass directly through the killing means. And best of all, the chemical insect-attractant means need not be closely monitored and constantly replenished as sex attractant must be.

f. When someone wants to utilize a prior art "zapper" to kill flies, they must apply the fly sex attractant and in addition turn the single circuit containing both the lamp and the killing means during the daytime. At this point not only has it cost extra for the attractant, but also the energy to continuously light the 150 to 300 watt bulb or bulbs that have no daytime effect, is being wasted. The insect killing receptacle cover, however, is extremely cost efficient in that the best chemical insect-attractant means, garbage, is free, it only intermittantly expends energy when an insect is electrocuted and there are no very costly ultra-violet bulbs that need to be replaced upon burnout. In contrast to the prior art, the device according to the present invention saves energy.

g. As above memtioned, one of the observed shortcomings of the insect "zappers" of the prior art is the fact that the alternately charged bars that actually electrocute the insects are mounted vertically. In the insect killing receptacle cover, according to the present invention however, the oppositely charged bars are mounted in the same horizontal plane of the receptacle cover. Being horizontally mounted across the hole that provides the only access to the chemical insect-attractant means is a major advantage over vertical bars. It has been observed that when flies land, or drop through a hole, they cut power to their wings and drop down. When insects, and specifically flies enter the insect killing receptacle cover, according to the instant application they immediately and without hesitation land on the nearest horizontal surface, which is comprised of the alternately charged bars. They complete the circuit from positive to negative through their bodies, are quickly electrocuted and fall directly and cleanly into the receptacle.

h. The normal site for prior art "zappers" is on a patio or in a backyard, and actually lure insects to the living area, which is contrary to their purpose of eliminating the presence of insects. In contrast, trash receptacles, however, are usually placed away from the living area. Receptacles fitted with an insect killing cover according to the present application would also be placed away from the living area, patio, yard, etc., and draw insects away from living areas, to be killed, thus reducing the number of bothersome insects in the living area.

i. One obvious advantage of the insect killing receptacle cover over prior art "zappers" is the cleanup. The area around the base of a prior art "zapper" is littered with unsanitary dead insects and their fragmented body parts. In contrast, insects killed by the insect killing cover and all their fragmented body parts according to the instant application, fall directly into the receptacle and require no cleanup because the killing means is located directly over the receptacle.

j. One added advantage of the insect killing receptacle cover according to the present application, is the fact that it is really a non-specific killer. When the present invention is embodied with a common trash receptacle many other insects attracted to garbage that enter through the killing means will also be killed. Hornets, yellow jackets, ants, spiders, some wasps and other garden pests can be controlled. Rotting fruit placed in the receptacle will attract the Medfly also and it too will consequently be killed. This is in contrast to the devices of the prior art which because of their limitations, kill only specific insects, either under night time conditions or by using an additional lure and therefore require a separate means for each of these functions as abovementioned being the ultra violet light and the sex attractant. Therefore the device according to the instant application, uses a simpler means, using less features than prior art and achieves a greater capacity to kill insects, utilizing the unexpected results of combining in one device, a chemical insect-attractant means comprised of an already existant available material, garbage, of a previously unrecognized value, a killing means, and a receptacle.

In conclusion, a trash receptacle according to the present invention, fitted with a cover that kills insects is advantageous over a plain trash receptacle because people would make a conscious effort to place and use it knowing that the cover would be killing unwanted insects. Also the cover according to the present invention, would control insect populations by not only attracting and killing insects outside the receptacle but also insects emanating from newly transformed larvae already in the receptacle.

Furthermore the insect killing receptacle cover is a great improvement over prior art ultra-violet light emitting electronic insect "zappers" for many reasons. These reasons include the fact that the insect killing receptacle cover when utilized on a common trash receptacle, is easy to use, the chemical insect-attractant means, in this application garbage, is more effective than ultra-violet light or sex attractant, and it is free. In contrast to the prior art "zappers" which continuously use energy, The insect killing cover can be left on at all times and doesn't waste energy, since it only expends energy when an insect is killed. The horizontal alternately charged bars cover the only access to the garbage, forcing the insect to drop through the bars, electrocute himself and fall cleanly into the receptacle. Also, other insects are attracted and killed as an added bonus.

Some other advantages become apparent with different embodiments. Any container with a chemical insect-attractant means inside that lures insects through a hole across which there is a horizontal electronic killing means insects would have all the advantages listed above. Variations in size, portability i.e. table top models, wall mounted units or units retrofitted into pre-existing containers or dumpsters are also conceivable. Also the lack of moving parts or electronic sophistication make the product inexpensive to manufacture, affordable to the consumer, reliable and effective. Various power sources for the killing means across the hole could be considered also. Battery power, solar power, or power from the rotting garbage itself could someday make the units totally portable and free to operate. Different futuristic killing means could also be considered, such as laser beams or force fields are possible. Trash compactors fitted with an insect killing aperture is another possible embodiment.

Further objects and advantages of my invention will become apparent from a consideration of the drawings and ensuing description of it.

LIST OF REFERENCE NUMERALS

1. HANDLE
2. INSECT DOME
3. COVER
4. INSECT PORT
5. HANDLE FASTENERS
6. COVER FASTENERS
7. COVER HOLE
8. CHARGED BAR RIGHT HALF
9. OPPOSITELY CHARGED BAR LEFT HALF
10. INSULATED MOUNTING BAR BRACKET
11. TRANSFORMER
12. POWER CORD
13. TRANSFORMER FASTENERS
14. CONNECTOR WIRES
15. BAR CONNECTOR POINTS
16. COVER GROMMET
18. SOLAR CELL
19. A.C. POWER SUPPLY
20. BATTERY
21. TRASH RECEPTACLE

DRAWING FIGURES

Figure 2:
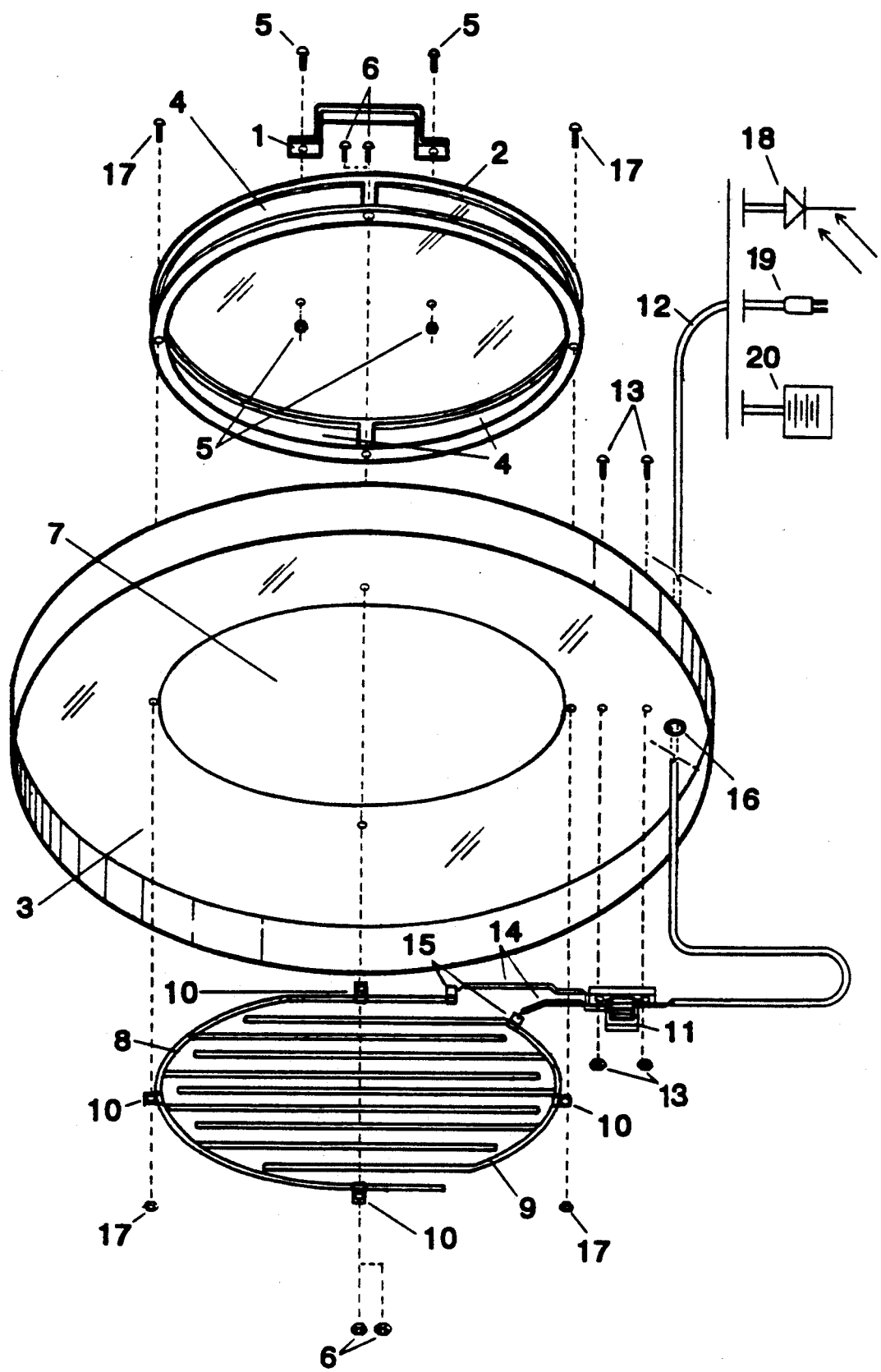

A typical embodiment of the present invention is illustrated in FIG. 1 (side view isometric). The trash receptacle (21) is fitted with a cover (3). A concentric hole (7), FIG. 2 is cut in said cover (3). Attached over the (7) is the insect dome (2) by fastening means (6) and (17). Mounted on top of the insect dome (2), is a handle (1), using the fasteners (5). Mounted underneath cover (3) and encompassing hole (7) are interlinking alternately charged bars, right half (8), and left half (9) by means of fasteners (6) through insulated mounting bar brackets (10). The alternately charged bars (8) and (9) are made of a conductive metal and mounted in a manner such that they are interwoven but never touching, maintaining an equal spacing between any and all bars of (8) and bars of (9). The size of the gaps between the bars (8) and (9) must be such that a large fly may pass between the charged bars (8) and (9), and still allow some part othe fly's body to complete the circuit between the alternately charged bars. A step-up transformer (11) a rating typical of prior art insect "zappers" is mounted by fasteners (13) to the underside of cover (3) in close proximity to bars (8) and (9) so that wires (14) can be efficiently connected between transformer (11) and bar connector points (15). A power cord (12) is connected to transformer (11) and passes through cover (3) protected and insulated by grommet (16). Insect dome (2) and cover (3) as well as handle (1) can be of any rigid or semi-rigid material such as metal, fiberglass, plastic, etc. The handle (1), insect dome (2), and cover (3) can be embodied as one piece, either by vacuum-forming or moulding plastic or fiberglass. This would eliminate the need for fasteners (5) and (17). The embodiment shown in FIG. 2 demonstrates the ability to retrofit a prior art trash receptacle cover. Various power sources shown in FIG. 2 are a solar cell (18), A.C. power supply (19) and a battery (20).

OPERATION OF INVENTION

This particular embodiment of the invention in FIGS. 1 and 2 refers to modification of a trash receptacle cover of design typical of prior art. The cover (3), however, has a hole (7) cut in it. When the cover (3) is placed on a standard trash receptacle (21) with garbage or other refuse placed inside, insect attracting odors, known to the art as a chemical escape through hole (7) and out insect ports (4). Insects attempting to reach the chemical insect-attractant means, in this case odors from garbage, follow the odors to their source fly into insect ports (4) and through hole (7). Mounted across and completely encompassing hole (7) are interspaced bars (8) and (9). The bars (8) and (9) are spaced far enough apart to prevent the discharge of high voltage between the bars (8) and (9) after being oppositely charged by the transformer (11). The bars (8) and (9) are spaced close enough together so that the body of the passing insect bridges between the bars (8) and (9) will permit the transfer of electricity between the bars (8) and (9) and through the insect's body, thus electrocuting the insect. The design and operation of the electrocuting bars (8) and (9) is of typical design of prior art relating to common insect "zappers". Any means such that the insect will be immediately killed when passing through hole (7) is acceptable however. Once the fly is electrocuted his remains drop cleanly into the receptacle (21) below.

CONCLUSION, RAMIFICATIONS, AND SCOPE OF INVENTION

Thus the reader will see that the insect killing receptacle cover, uniquely combines two prior art devices into a new product that is extremely effective, easy and economical to use, inexpensive to produce and purchase and best of all it kills many day active insects and specifically flies at a rate exceeding the rate of the prior art.

While my above description contains many specificities, these should not be construed as limitations on the scope of the invention, but rather as an exemplification of one preferred embodiment thereof. Many other variations are possible. For example, the container and cover can be of any size, as small as a soup can or as large as a dumpster. As long as there is at least one hole, of any shape such that a chemical insect-attractant means inside the container will draw an insect through the hole to be killed attempting to reach the chemical insect-attractant means. The power as mentioned before, can vary from battery, to standard household A/C, to solar, or any power source. The killing means across the hole could be alternately charged bars, layers of alternately charged mesh or a laser field, the possibilities are endless.

Accordingly, the scope of the invention should be determined not by the embodiment illustrated, but by the appended claims and their legal equivalents.

I claim:

1. A receptacle and receptacle cover with an integral flying insect killing means the device comprising:

a receptacle fitted with a removable receptacle cover, a hole in said receptacle cover allowing flying insects access to said receptacle, an electrical killing means mounted completely across said hole comprising alternately charged bars spaced apart at a dimension such that the transfer of energy between said bars will not occur yet said bars spaced close enough such that the bodies of said insects will contact said bars allowing the transfer of energy between said bars and through said bodies of said insects instantly killing said insects, said killing means to be continuously charged by a transformer.

an attached cover mounted over said hole having at least one port allowing said flying insects access to said hole and said killing means, said receptacle to be located directly below said hole such that said insects killed by said killing means will fall directly into said receptacle, said receptacle to be of sufficient size to contain refuse, said refuse to act as an insect lure.

2. The device according to claim 1 in which the killing means is supplied power by a battery.

3. The device according to claim 1 in which the killing means is supplied power by a solar cell.

* * * * *